Feb. 9, 1937.    F. H. STONER    2,070,070
PLATFORM BOX
Filed Aug. 1, 1935    2 Sheets-Sheet 1

Inventor
Frank H. Stoner
By Faust H. Crampton
Attorney

Feb. 9, 1937.  F. H. STONER  2,070,070
PLATFORM BOX
Filed Aug. 1, 1935   2 Sheets-Sheet 2
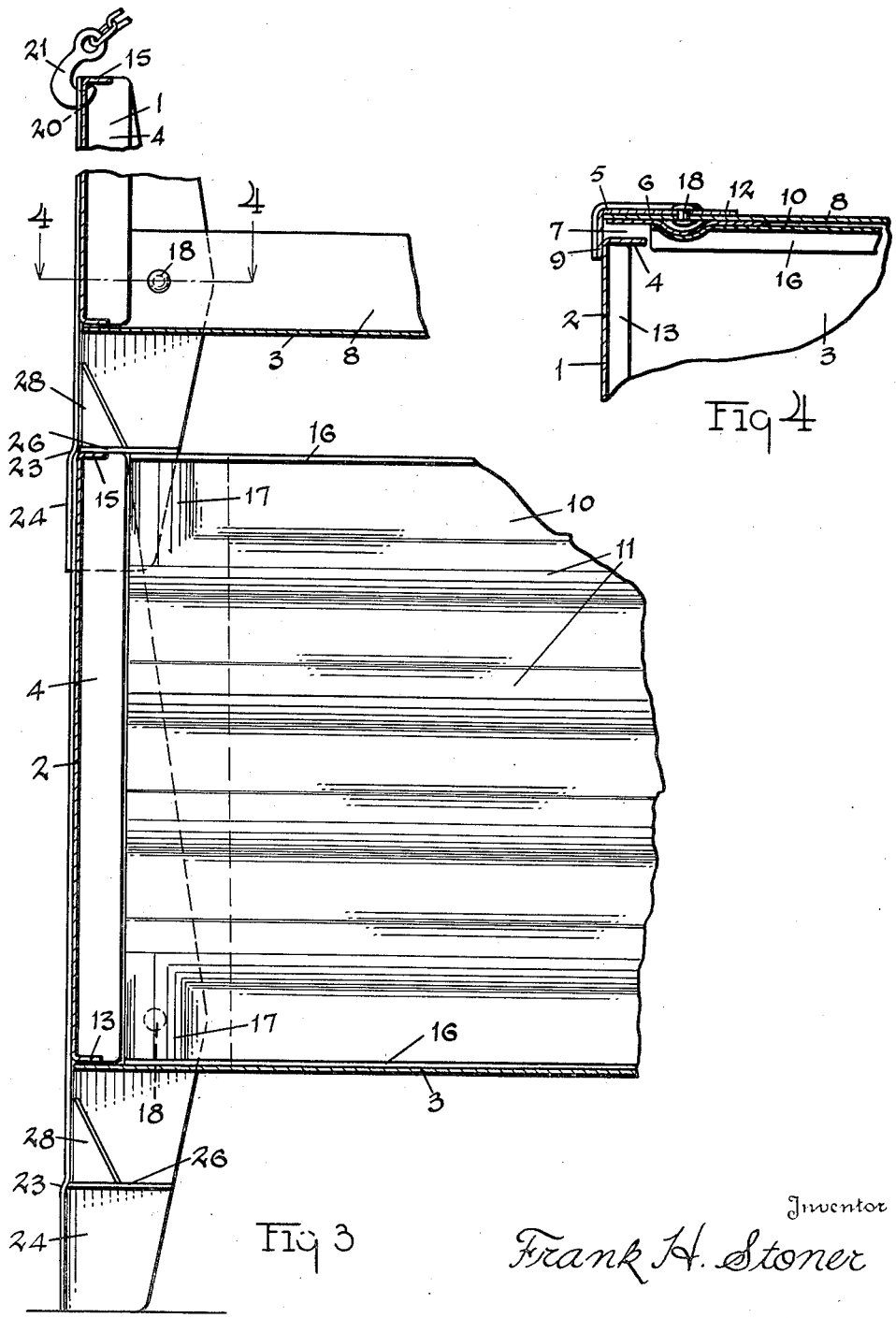
Inventor
Frank H. Stoner Patented Feb. 9, 1937

2,070,070

UNITED STATES PATENT OFFICE 2,070,070

PLATFORM BOX

Frank H. Stoner, Monroe, Mich.

Application August 1, 1935, Serial No. 34,217

4 Claims. (Cl. 220—6)

My invention relates to platform boxes used for handling castings and parts that are shifted from place to place in factories.

One object of my invention is to provide a platform box suitable for use in factories and having the strength and durability to withstand the hard wear to which such boxes are necessarily subjected. The box of my invention is so constructed as to have the necessary rigidity and strength to maintain the weight of heavy metal parts and at the same time is so constructed as to be of a minimum weight, thereby permitting easy handling of the box.

A still further object of my invention is to provide a platform box which may be readily knocked down and folded flat when not in use and readily reassembled into a rigid, maximum weight-sustaining box. When not in use the box may be folded and stored in a minimum space and may be readily shipped from place to place.

A still further object of my invention is to provide a platform box having the required characteristics and particularly suited for factory use. The box is so constructed that a lift truck may be readily employed, sufficient clearance being given to receive either a high or low lift truck. The box is also adapted for use with a lift crane and has means whereby the hook of the crane may be readily inserted in openings formed for the purpose and the box moved from place to place in the factory.

A further object of my invention is to provide a means whereby platform boxes of my invention may be stacked for purposes of storing or shipping castings and similar parts from place to place. The boxes may be stacked in such a way that a rigid stacked construction is obtained and consequently there is no danger of the boxes' toppling or falling as a result of jar or shock.

The invention consists in other features and advantages which will appear from the following description and upon examination of the drawings. Structures containing the invention may partake of different forms and still embody the invention. To illustrate a practical application of the invention, I have selected a platform box as an example of the various structures and details thereof that contain the invention and shall describe the selected platform box hereinafter, it being understood that variations may be made without departing from the spirit of the invention. The particular platform box selected is shown in the accompanying drawings and described hereinafter.

Figure 1:
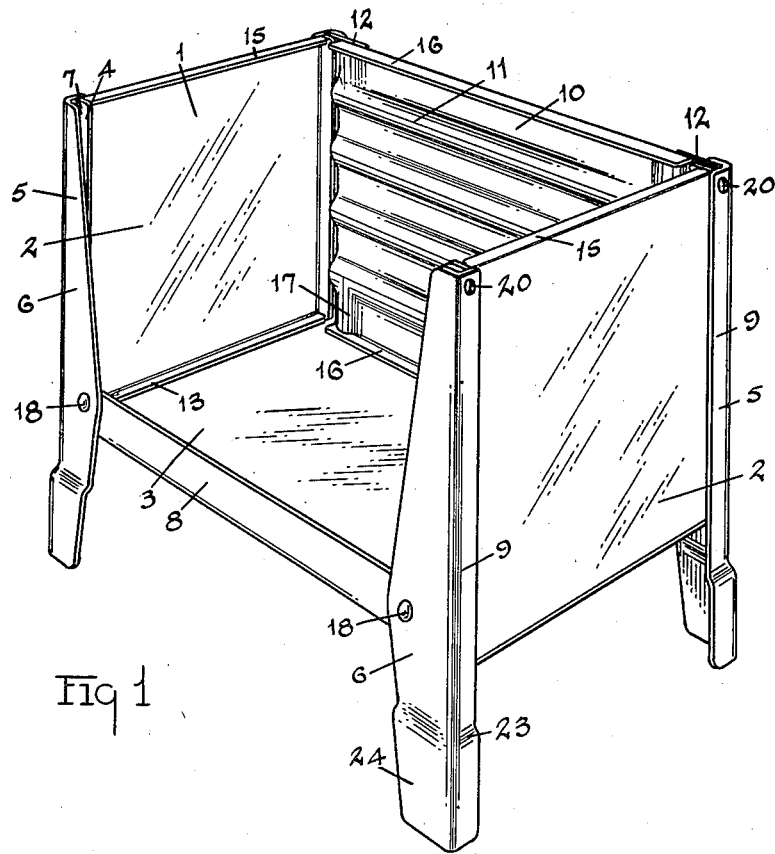
Figure 2:
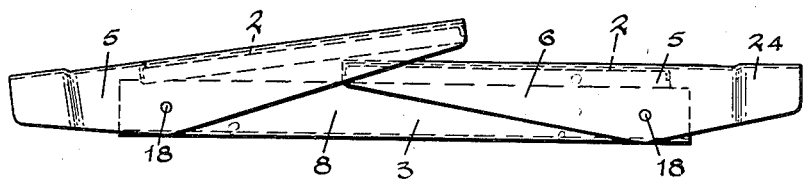

Fig. 1 is a perspective view of the platform box, one of the side parts being removed. Fig. 2 illustrates the box folded for purposes of storage or shipping. Fig. 3 is a view of a part of the box and illustrates various of the reinforcements and means for stacking the boxes. Fig. 4 is a view of a section of the box taken along the plane of the line 4—4 in Fig. 3.

The box of my invention is formed to have end parts pivotally connected to a bottom part and having channels adapted to receive side parts in slidable engagement. When the side parts are removed, the end parts may be readily folded with respect to the bottom portion and the box stored or shipped. The side parts are interchangeable. The end parts are provided with leg portions which give sufficient clearance to permit the insertion of high or low type lift trucks, and the legs are so constructed and reinforced that the boxes may be readily stacked with respect to each other, portions of the legs fitting over and engaging the corners of the next lower box to form a rigid, stacked arrangement.

In the construction shown in the drawings, the box 1 is preferably constructed of sheet metal or other suitable light-weight, substantially rigid material and comprises end parts 2 and a bottom part 3. The end parts 2 are formed to have side edge flanges 4. The legs 5 are formed L-shaped and have sides 6 and 9. The side 9 may be welded or otherwise suitably fastened to the end parts. The sides 6 are pivotally connected to the upturned flange 8 of the bottom 3 at points remote from the ends of the bottom part. The side walls 10 are preferably corrugated as at 11 to increase their strength and are provided with strips 12, which may be welded to the end edge portions of the side walls. The flanges 4 and the sides 6 of the legs form channels 7 adapted to receive the strips 12. The end parts 2 are provided with the flanges 13 formed at substantially right angles to the end parts and adapted to fit flush against the interior surface of the bottom 3 and at the ends of the bottom. In assembling the box, the flanges 13 form a stop with the ends of the bottom 3 and prevent outward movement of the end parts beyond the vertical with respect to the bottom part. The end parts and side walls are provided with flanges 15 and 16, respectively, to form a smooth surface at the upper limits of the side walls and end parts, and the lowermost flange 16 of the side walls fits flush against the surface of the bottom 3.

In order that the strips 12 may be readily inserted through the channels 7 and the side walls fit flush against the bottom 3, the walls are provided with the corrugation or channel 17 formed at right angles to the corrugations 11 and adapted to fit over the pivotal connection 18 between the legs 5 and the upturned flange 8.

As shown in Fig. 4 the strip 12 and the side part 10 fit over the pivotal connection 18 by reason of the channel or corrugation 17 formed in the side part and the strip, and the pivotal connection 18 is so located with reference to the side walls that the reinforcing strips 12 are maintained in the channels 7 in the vicinity of the connection, and the side walls may be inserted flush with the upper surface of the bottom 3.

In order that the box may be readily lifted by the lift truck commonly used in connection with factory work, the legs 5 are so constructed that sufficient clearance is given between the bottom part and the supporting surface so that the lift truck may be readily inserted either at the ends or sides of the box. The upper corners of the box are also provided with suitable openings 20, and if it is desired to lift the box by a hoist crane, the hook 21 of the crane may be readily inserted in the openings 20 as shown in Fig. 3.

As is well known, it is often found desirable to pack machined parts and similar products in platform boxes for purposes of storage or shipping. In such cases it is customary to stack the boxes, and the box of my invention provides efficient means for stacking the boxes in a substantially rigid construction. The legs 5 are preferably distended as at 23 and form the portions 24 adapted to fit over parts of the sides and end parts. Each portion 24 is provided at its upper limit with a stop 26 suitably reinforced as by the diagonal 28. In stacked arrangement the stop 26 engages the flanges 16 and 15 of the sides and end parts, respectively. Thus it is possible to stack the boxes upon each other, the portions 24 of the legs being of such dimension as to fit snugly about the exterior surface of the end parts and sides of the four corners of the box, the stop 26 fitting flush against the flanges 15 and 16 at the box corners to form a substantially rigid stacked arrangement. Should the stacked arrangement receive shock or jar, the dimensions of the parts 24 and the relation of the stops 26 to the flanges 15 and 16 are such that the boxes will be maintained in their stacked arrangement, and hence the danger of toppling and probable breakage of castings either in shipment or storage is eliminated.

I claim:

1. In a platform box, a bottom part, uprights pivotally connected to the bottom part at points materially remote from the corners of the bottom part, end parts having inturned flanges, certain of the flanges secured to the uprights and forming channels in the said uprights, the lower flanges of the end parts located at the ends of the bottom part, side parts adapted to be slidably engaged in the said channels, the side parts having inturned flanges, the lower flanges located at the sides of the bottom part.

2. In a platform box, a bottom part, leg portions pivotally connected to the bottom part at points materially remote from the corners of the bottom part, end parts secured to the leg portions and having inturned flanges, certain of the flanges forming channels in the said leg portions, the lower flanges of the end parts located at the ends of the bottom part, side parts adapted to be slidably engaged in the said channels, the side parts having upper and lower inturned flanges, the lower flanges located at the sides of the bottom part, parts of the leg portions adapted to fit portions of the end and side parts.

3. In a platform box, a bottom part having side flanges, end parts having inturned flange parts pivotally connected to the said side flanges of the bottom part and adapted to fold against the inside of the bottom part and to engage end portions of the bottom part when unfolded from the bottom part and having flanges spaced inwardly from the said inturned flanges and disposed at the sides of the said end parts, the side parts slidably supported intermediate the spaced flanges of the end parts and adapted to maintain the parts of the box in rigid, assembled relation.

4. In a platform box, a bottom part, leg portions pivotally connected to the bottom part at points materially remote from the corners of the bottom part, the leg portions having walls located at substantially right angles, one of the said walls secured to the end parts, the end parts having inturned flanges located at their side edges and substantially parallel to the said other wall of the leg portions, the said flanges and the said other walls forming channels, the end parts having upper and lower flanges, the lower flanges located at the ends of the bottom part, side parts having reinforcing strips at their end edges, said reinforcing strips adapted to be slidably engaged in the said channels, side parts having upper and lower flanges and grooves adapted to fit the said pivotal connection, the lower flanges of the side parts located at the sides of the bottom part.

FRANK H. STONER.